June 15, 1965    R. M. EISENBERG ETAL    3,188,911
METHOD OF PREPARING A SIMULATED GROUND CONTOUR MAP
Original Filed April 7, 1959
FIG. 1
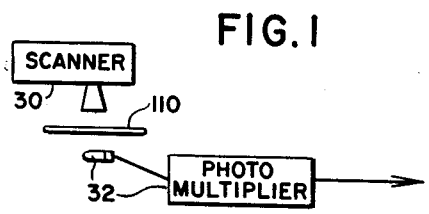
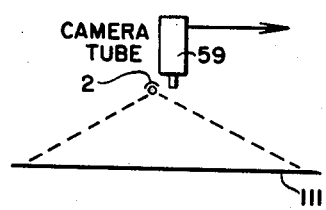
FIG. 2
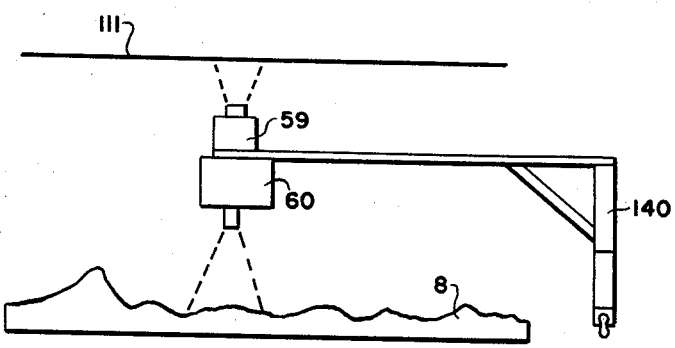
FIG. 3
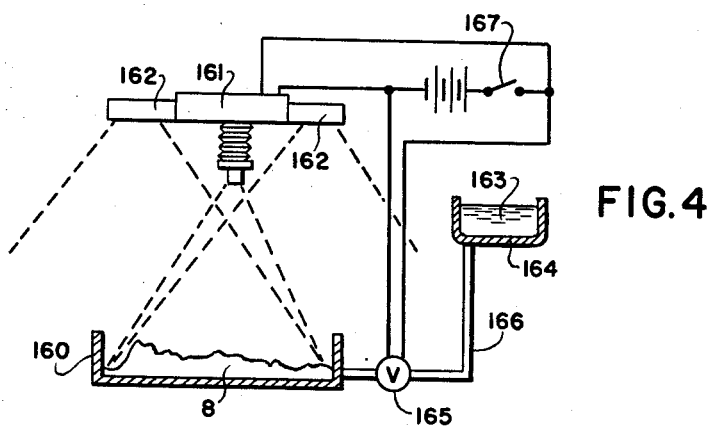
FIG. 4

United States Patent Office 3,188,911
Patented June 15, 1965

3,188,911
METHOD OF PREPARING A SIMULATED
GROUND CONTOUR MAP
Robert M. Eisenberg, Rockville, and William P. Jameson,
Silver Spring, Md., assignors to ACF Industries, Inc.,
New York, N.Y., a corporation of New Jersey
Original application Apr. 7, 1959, Ser. No. 804,733, now
Patent No. 3,066,424, dated Dec. 4, 1962. Divided
and this application Nov. 14, 1962, Ser. No. 237,468
4 Claims. (Cl. 88—24)

This invention relates to radar simulation apparatus and more particularly to equipment for training student radar operators in the use of ground and contour mapping and terrain avoidance equipment. This application is a division of application Serial No. 804,733, filed April 7, 1959, now U. S. Patent No. 3,066,424 issued December 4, 1962.

An object of this invention is to provide a method of manufacturing a two-dimensional storage device capable of providing three-dimensional terrain elevation information for use with equipment which responds to three-dimensional information.

A further object of this invention is to provide a radiation method of producing a two-dimensional map of three-dimensional terrain contours.

Still another object of this invention is to provide a photographic method of producing photo prints containing three-dimensional indicia.

Other novel features and objects of the invention are set forth in the appended claims and the invention as to its organization and its mode of operation will best be understood from a consideration of the following detailed description of the preferred embodiment when used in connection with the accompanying drawings which are hereby made a part of the specification and in which:

FIG. 1 is a representation of a system employing a scanning device and a transparency for controlling the radar presentation.

FIG. 2 is a representation of a camera scanning system in which an opaque print of the terrain is employed.

FIG. 3 shows the arrangements of opaque print and three-dimensional terrain map relative to the camera carrying apparatus.

FIG. 4 shows apparatus for producing transparencies of terrain elevation by the photographic process.

The invention provides for the use of a three-dimensional terrain map and a camera optical system whereby the camera is moved relative to the terrain map in accordance with the movements of the simulated aircraft. The resulting image is conducted to a simulated radar scope within the view of an operator. The three-dimensional terrain model is mounted on a flat bed or frame and may be cast or formed of a plastic material. Cultural areas and target complexes are painted on the map surface as a pattern of spotted gray area or may be cast in relief as blocks of plastic painted the proper color or gray shade corresponding to the radar reflectivity of the object or objects. Water appears as a glossy black surface while land areas are painted a flat gray or are textured with fine grit to yield desired reflective properties.

The invention concerns X-ray and photographic methods of producing two-dimensional transparencies or photo prints of the three-dimensional terrain contours for use in simulating a radiation altimeter system.

FIG. 1 shows a method utilizing a photo transparency whose emulsion density is inversely proportional to terrain altitude. The area of the earth's surface represented by this transparency is identical to that of the same area depicted by the three-dimensional terrain model in use for the ground mapping problem. A flying spot scanner 30, positioned horizontally in synchronism with the camera prism and light source assembly on the terrain model gantry, and deflected in the same scan program as that of the camera tube, is mounted on one side of the transparency 110. A photomultiplier tube 32 is positioned in the same manner on the opposite side of the transparency. The output of the photomultiplier for each sweep made by the flying spot is a wave form whose instantaneous amplitude at any point on the wave is proportional to the terrain altitude at that same point in range on the map's surface.

FIG. 2 shows a method whereby an opaque print 111 and camera tube 59 are used in lieu of the transparency and flying spot scanner to derive the terrain altitude voltage. The terrain elevation information is stored on the print as varying shades of gray. The highest terrain being depicted by white and lowest being depicted by black.

This additional equipment just described may be mounted in a number of ways, the choice of mounting being determined by the space available. The transparency or opaque print may be mounted under the terrain model bed or suspended above the terrain model carriages as in FIG. 4 with the light source and pickup driven directly by the terrain model gantry 140. These auxiliary devices may also be mounted vertically on the side of the gantry or in a separate cabinet with servo drives for the light source and pickup devices receiving their inputs directly from the gantry servos.

The choice of either the transparency 110 or opaque print 111 techniques is dependent on the space available. It will be noted from FIGS 1 and 2 that the transparency requires the use of devices mounted on either side of the plate while the opaque print need only have components on one side. The cost of either of these elevation storage medium is a function of the scale ratios required, the larger scale ratio being the more expensive choice. In operation the amplitude of the actual contour information voltage is compared to the preset clearance altitude amplitude voltage and when the contour information is greater than the desired clearance the video from the terrain model camera is gated into the operator's radar indicator permitting this video to be displayed. By this means only the video from objects above the clearance plane are displayed to the operator.

A unique method of producing a transparency, having high resolution altitude information contained thereon, has been devised. The transparency 110 as shown in FIG. 1 and the print 111 as shown in FIG. 2 are capable of providing accurate terrain variation or altitude information only to the extent of their own accuracy. Terrain transparencies which rely on models constructed from elevation lines are limited in their usefulness and accuracy due to the arbitrary interpolation or filling in between known elevation points. Previously used processes for producing two-dimensional storage of three-dimensional information required that contour information be extracted from charts or aerial photographs and hand painted on a flat opaque or flat transparent sheet of material. The resulting planar record of terrain elevation contains incremental elevation changes while the device produced by the above process contains continuous elevation data. The process disclosed herein results in an appreciable saving of time and material over the known processes. In radar simulation systems which require both a three-dimensional terrain model for ground mapping and a transparency or print for terrain avoidance control circuitry, the use of the described process with the three-dimensional model will assure compatability between the two information gathering mechanisms.

Various horizontal scale ratios of expansion and contraction may be obtained from a single three-dimensional model through enlarging techniques. By the method about to be described, high resolution elevation and terrain transparencies may be produced which are capable of producing accurate altitude information for use with simulated radar systems. The resultant transparencies and any photographic prints made from them will have shading from black to white which will represent relative altitude at all points on the print.

The method of producing two-dimensional storage of terrain elevation information utilizes a three-dimensional model of the area of interest, black opaque fluid and photographic techniques. In the preferred embodiment shown in FIG. 4, a three-dimensional model 8 is painted white and placed in a tank 160 under a camera 161. Light sources 162 are placed so as to provide light rays parallel to the line of vision of the camera lens to thereby eliminate shadow effects. Small apertures are formed in the model at the lowest points in any map depression which has no natural drainage path to the sea level datum plane. Such a depression might represent a mountain lake, volcanic opening or other indentation. A dark opaque fluid 163, such as ink, is retained by valve 165 in container 164 and piping 166 until the process is commenced.

The camera shutter and valve controlling the flow of liquid into the tank are synchronized so that both are opened simultaneously. One such arrangement utilizes battery operated shutter and valve solenoids which open in response to the closing of switch 167. The camera shutter and piping valve are both held open until the terrain model 8 is completely covered with the liquid, and then they are closed. The areas of low elevation on the model will receive the shortest exposure time, since they will be covered by the liquid first, while the highest elevation will receive the longest exposure time. The negative thus produced will have an emulsion density proportional to terrain elevation.

Undesirable shadowing effects may be minimized by increasing the number of light rays and the angle at which they strike the model or by movement of the camera over the model surface so that a more direct alignment between reflected light from the model and the photoplate is realized.

A variation of this process involves the use of cheese cloth or like material formed to the contour of the terrain. In such a case, as the ink or dark fluid entered the model area it would rise uniformly throughout the material and not be hampered by the physical obstructions of the model. Use of such material yields a more uniform gradient exposure.

The relative density of the exposure will be a relative measure of the terrain altitude while the general density may be controlled by the variations of any one of several parameters. Variations which may be made are in the lens aperture, the film speed, light intensity, fluid flow rate, and the film developing process.

It may easily be seen that this process, though simple in execution, provides an accurate representation of terrain contour and altitude for use in radar simulation apparatus or with other equipment which utilizes terrain contour or altitude information. A variation of this process would comprise the use of a dark colored model with a light colored fluid. In this case the lower levels of the model would provide exposure light for the longer period of time while the higher levels of the model would affect the photographic plate for a shorter time and therefore present a variation in terrain contour on the negative in accordance with the contours of the model.

Many modern day aircraft utilize a radio or radar altimeter for indicating to the pilot his exact distance above the ground. The use of this type of equipment has the advantage that the pilot need not know the altitude of the ground above sea level for determining his own altitude above the ground. Also, since the range limits of the radar altimeter are much less than a pressure activated instrument, but more accurate within the smaller range, accurate simulation of a radar altimeter is difficult to obtain. This invention provides apparatus for accurately simulating radar altimeter systems.

Since the terrain map transparency 110 of FIG. 1 and the terrain map print 111 of FIG. 2 have shading gradients between black and white in dependence upon terrain contour or altitude, the light passing through the transparency or reflected from the print at the point representing the simulated aircraft position is a measure of the aircraft altitude above the terrain at that point.

Flexibility is realized through providing a means for changing the target complex areas of a terrain model. Further, the entire map may be replaced and aligned rapidly to represent other known areas of interest. Modification for new radar characteristics is simply a matter of replacing those portions of the light source, sweep and gating circuitry affected.

The methods of producing the two-dimensional transparencies from three-dimensional information and their resulting high resolution or altitude variation indication represent great improvements over previous devices.

It should be understood that this inventon is not limited to specific details of construction and arrangement herein illustrated and that changes and modifications may occur to one skilled in the art without departing from the spirit of the invention; the scope of the invention being set forth in the following claims.

What is claimed is:

1. The method of manufacturing a photographic print for simulating variations in a surface contour comprising preparing a terrain model mold having the general contours of the terrain to be simulated, directing light rays so that they impinge upon the surface of the terrain model, opening simultaneously the shutter of a camera focussed on the mold and the outlet of a black opaque fluid source so that a photographic film in the camera is exposed as fluid gradually covers the mold, the outlet of the fluid source being closely adjacent the top of the terrain model, the lower portions of the mold being exposed a shorter period than the higher portions of the mold which are covered last by the fluid.

2. The method of manufacturing a photographic print for use in apparatus whose purpose is to distinguish gradual variations in a surface comprising preparing a terrain model mold having the general contours of the surface, directing light rays so that they impinge upon the surface, exposing a photographic film to light reflected by the mold as black opaque fluid gradually covers the mold, the lower portions of the mold being exposed a shorter period than the higher portions of the mold which are the last covered by the fluid.

3. The method of manufacturing a photographic print for use in flight simulator apparatus whose purpose is to distinguish variations in ground contour comprising preparing a terrain model mold having the general contours of the ground of interest, directing light rays so that they impinge upon the surface of the terrain model, opening the outlet of a black opaque fluid source, the outlet being closely adjacent the top of the terrain model, exposing a photographic film as black opaque fluid gradually covers the mold, the lower portions of the mold being exposed a shorter period than the higher portions of the mold which are covered last by the fluid.

4. The method of manufacturing a photographic print for use in flight training radar altimeter apparatus whose purpose is to distinguish variations in a surface contour comprising preparing a terrain model mold having the general contours of the terrain to be simulated, directing light rays so that they impinge upon the surface of the terrain model, opening simultaneously the shutter of a camera focussed on the mold and the outlet of a black opaque fluid source so that a photographic film is exposed as the fluid gradually covers the mold, the lower portions of the mold being exposed a shorter period than the higher portions of the mold which are covered last by the fluid, the outlet of the fluid source being adjacent the upper surface of the mold.

References Cited by the Examiner
UNITED STATES PATENTS

| | | | |
|---|---|---|---|
| 2,151,817 | 3/39 | Wenschow | 88—24 X |
| 2,556,798 | 6/51 | Concordet. | |

NORTON ANSHER, *Primary Examiner*.